June 30, 1959 J. DAUGHERTY 2,892,388
MULTIPLE LINE FEED FOR TRANSLATABLE MACHINE ELEMENTS
Filed July 24, 1951 9 Sheets-Sheet 1

INVENTOR
Jesse Daugherty
Carlson, Pitzner, Hubbard & Wolfe
ATTORNEY

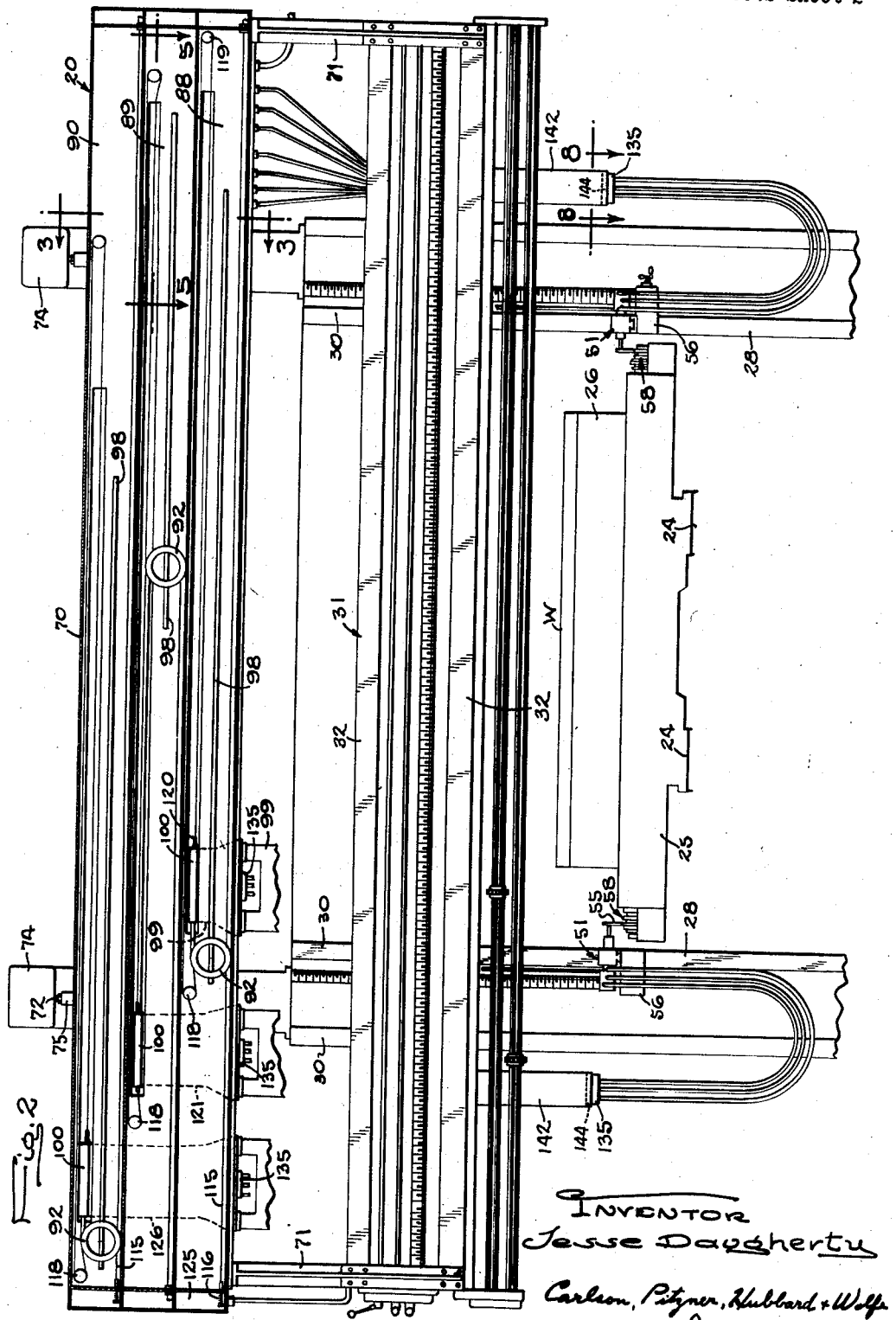

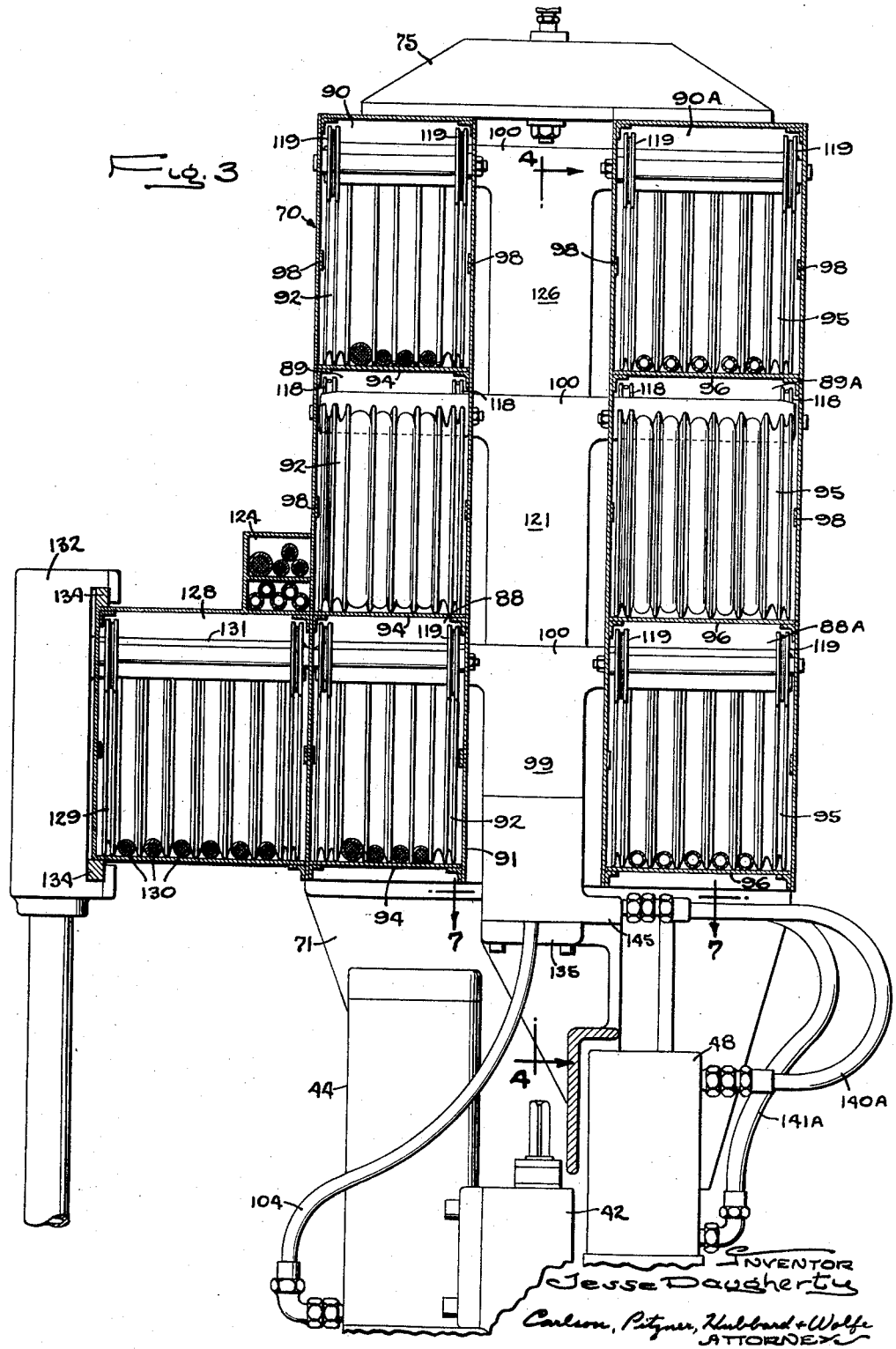

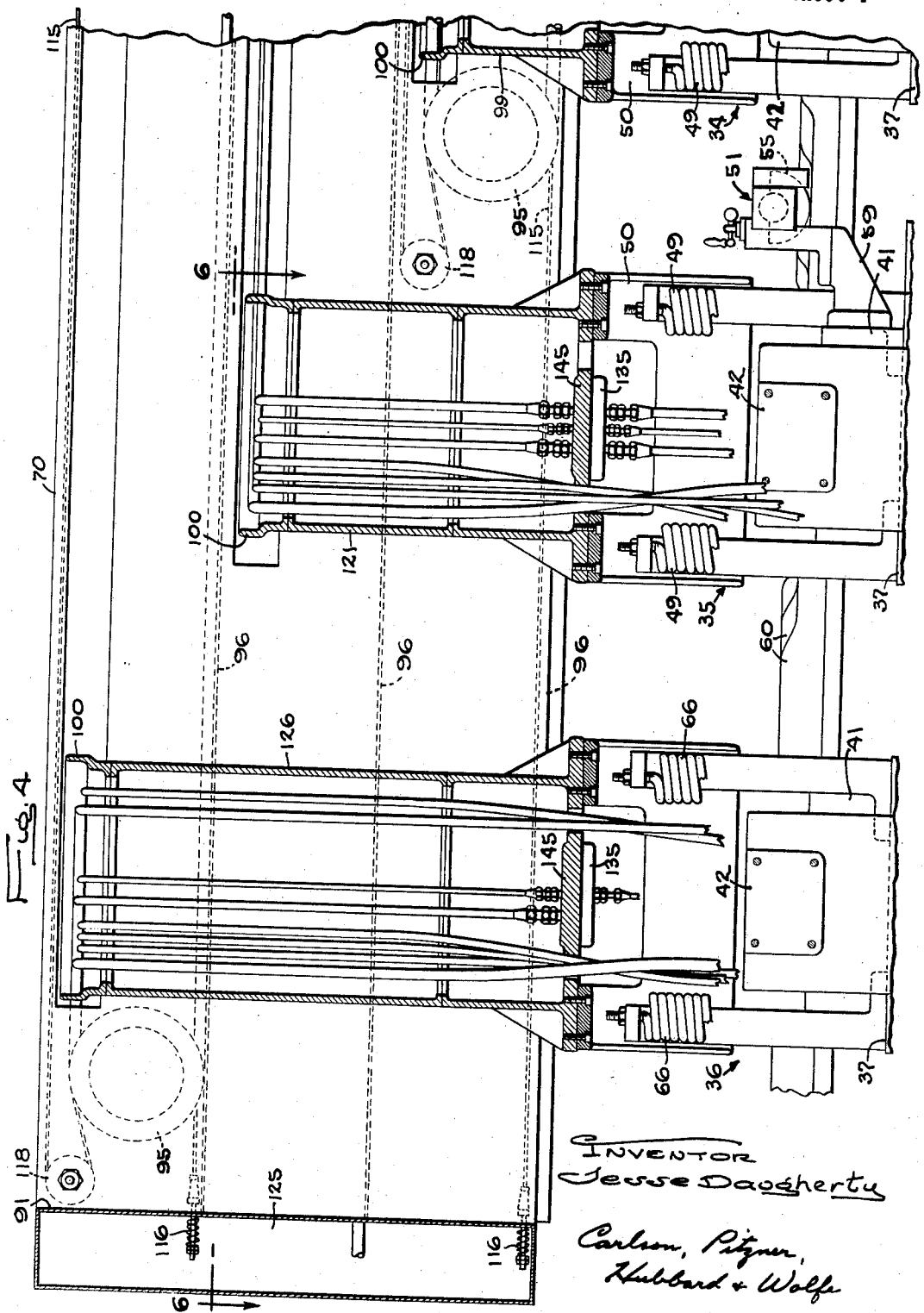

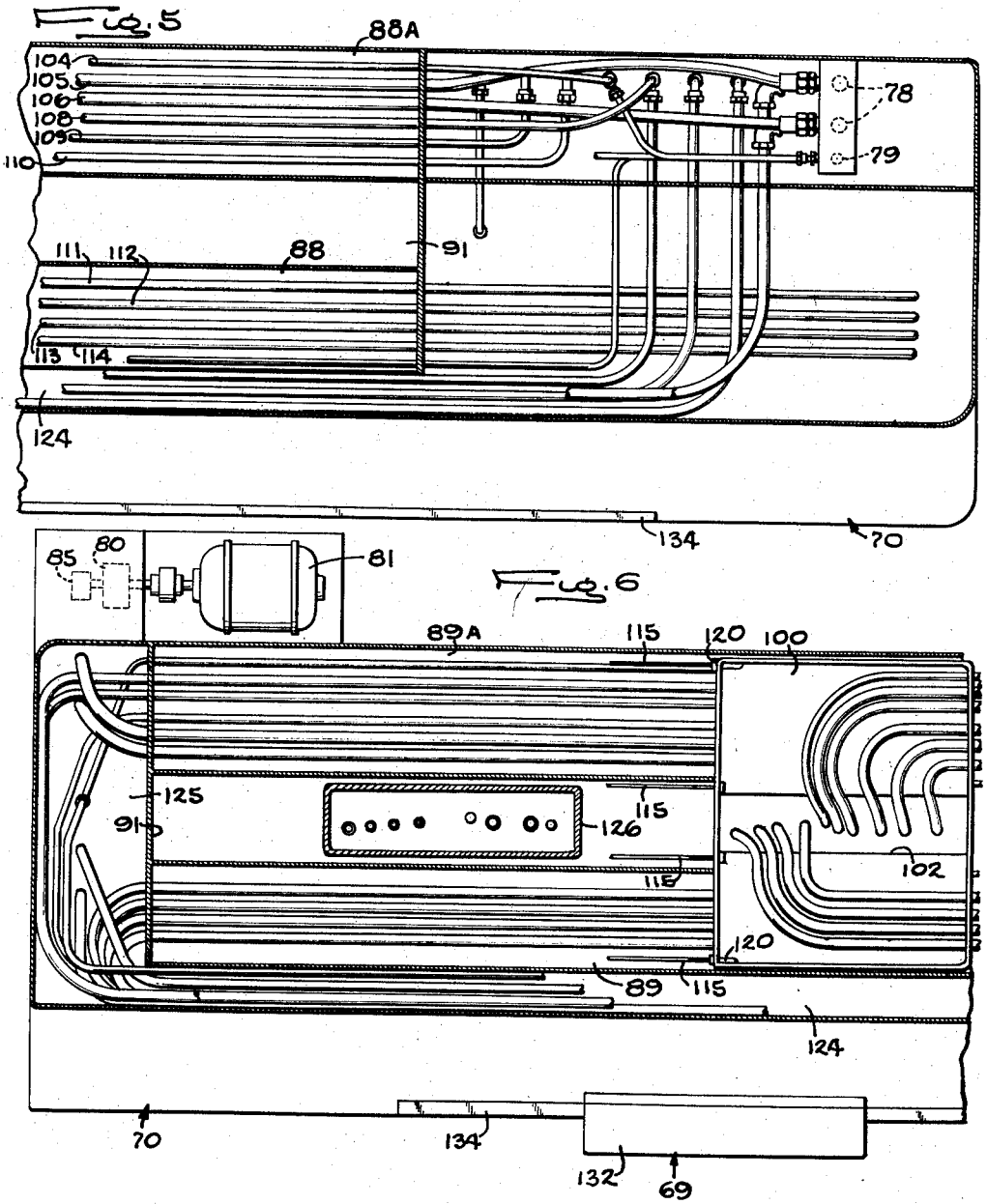

June 30, 1959     J. DAUGHERTY     2,892,388
MULTIPLE LINE FEED FOR TRANSLATABLE MACHINE ELEMENTS
Filed July 24, 1951     9 Sheets-Sheet 6
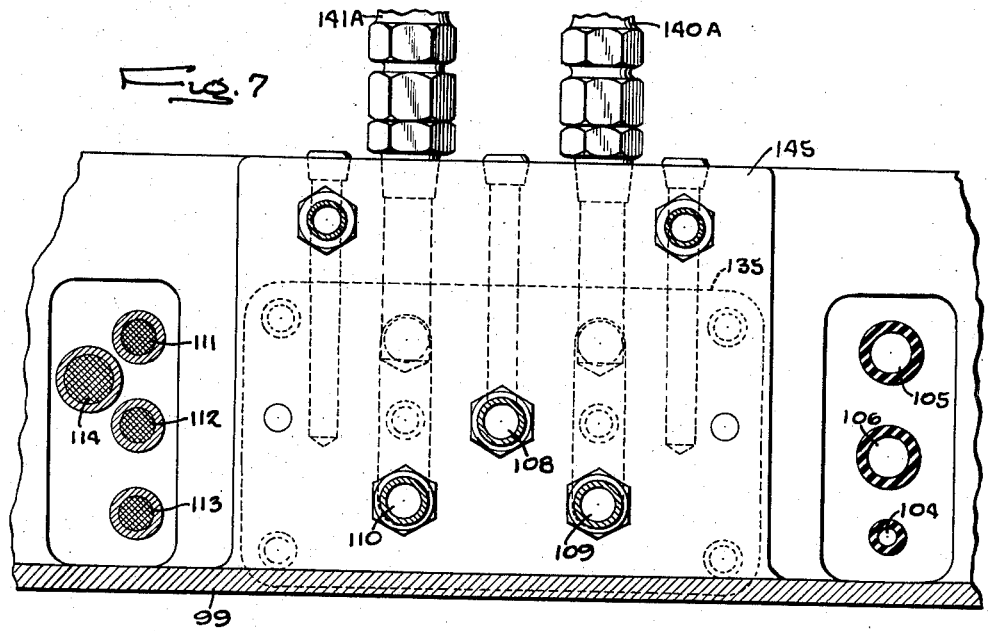
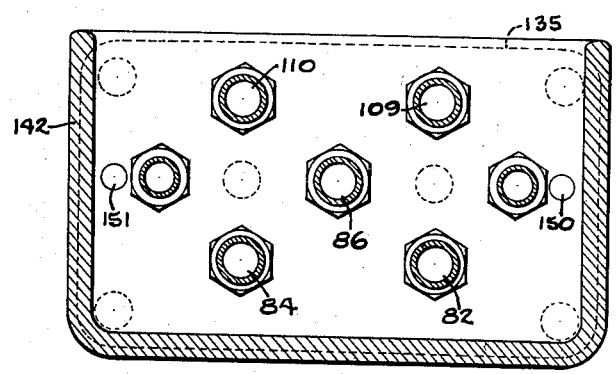
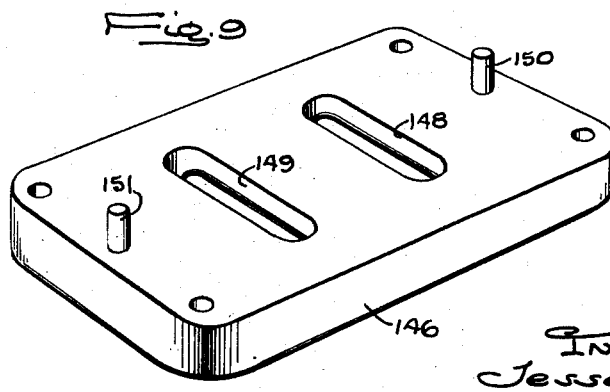
INVENTOR
Jesse Daugherty
Carlson, Pitzner, Hubbard & Wolfe
ATTORNEYS

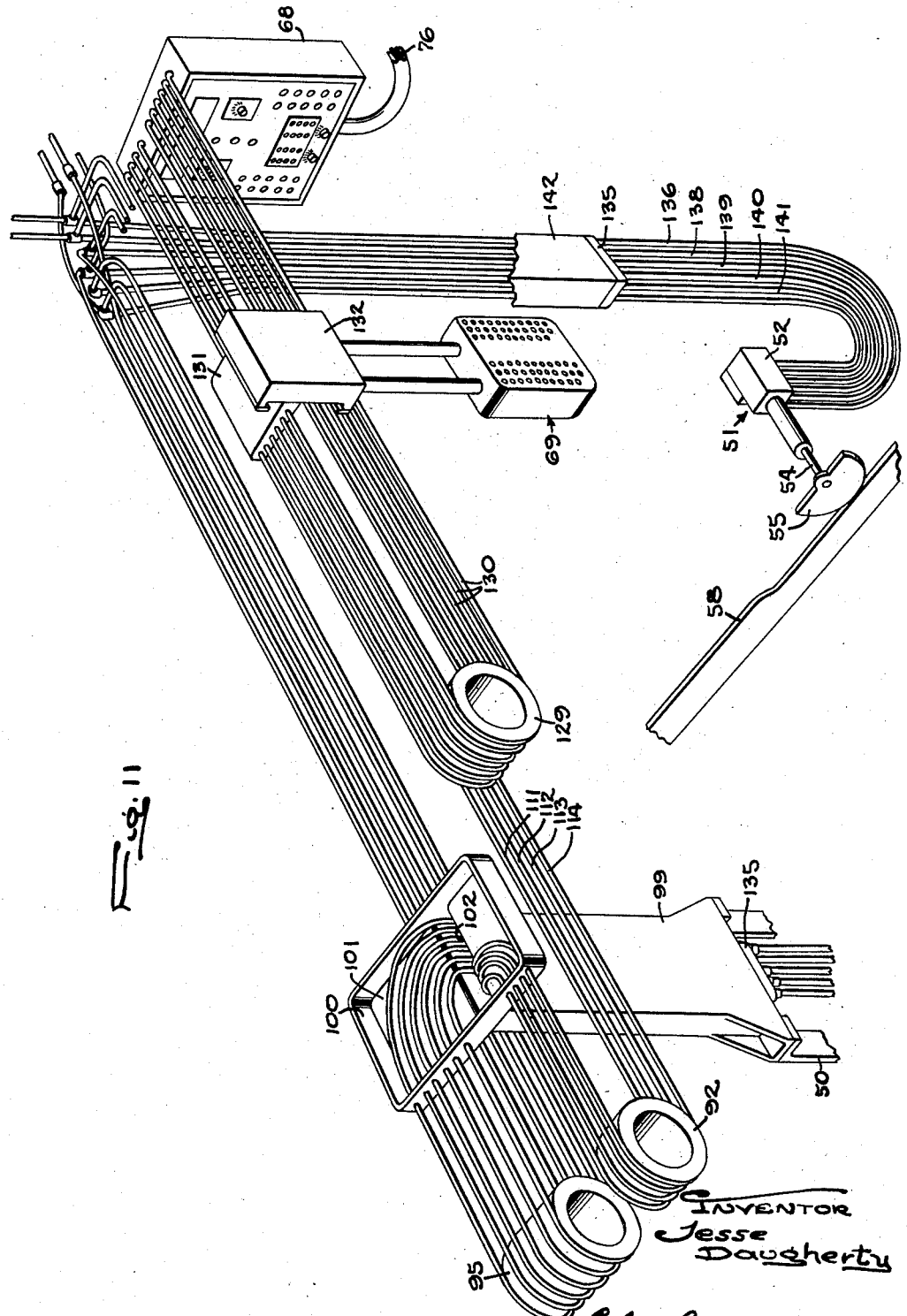

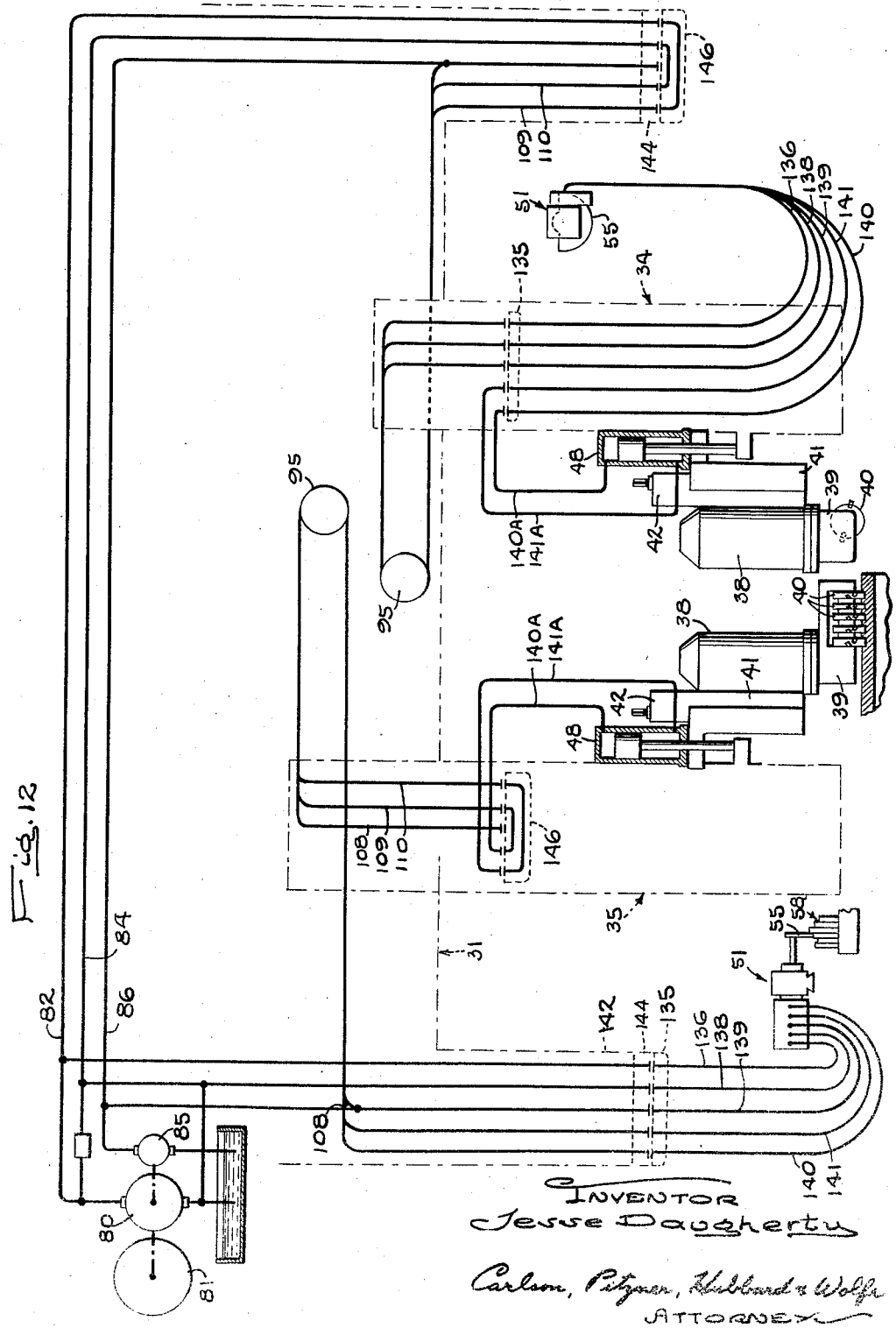

United States Patent Office
2,892,388
Patented June 30, 1959

2,892,388

MULTIPLE LINE FEED FOR TRANSLATABLE MACHINE ELEMENTS

Jesse Daugherty, Fond du Lac, Wis., assignor to Giddings & Lewis Machine Tool Company, Fond du Lac, Wis., a corporation of Wisconsin Application July 24, 1951, Serial No. 238,295

10 Claims. (Cl. 90—15)

The present invention relates in general to the machine tool field and more specifically to a novel arrangement for handling the service and control connections between a major structural unit of the machine and a plurality of translatable machine elements.

The invention is particularly well adapted for use in a large planer-type milling machine having a plurality of individually driven, movable headstocks, such as the machine disclosed in our Patent No. 2,849,927, issued September 2, 1958. Such use is by no means an exclusive one, however, since the invention is also adaptable to a variety of other machines. In one of its aspects, the present invention represents an improvement over the structure disclosed in Patent No. 2,395,485, issued February 26, 1946 to Gordon H. Jones.

One object of the invention is to provide means for feeding a relatively large number of flexible service and control lines or conduits from fixed points on a major structural unit of the machine to a plurality of individually powered headstocks or the like which are susceptible of translational movement relative to such structural unit.

Another object is to devise a means of the character set forth and capable of feeding the flexible lines or conduits to the translatable machine elements without interference, performing in a safe and foolproof manner with virtually no likelihood of failure during operation of the machine.

A further object is to provide a means of the type set forth and adapted to feed the flexible lines without subjecting the translatable machine elements to intolerable drag which could impair their machining accuracy.

Another object is to devise a line feed means of the foregoing type including a novel manifold structure capable of minimizing the number of lines which must be fed to the translatable machine elements.

Still another object is to provide a line feed means of the character set forth and which will be susceptible of incorporation into a clean-cut housing structure which enhances the general appearance of the machine.

Other objects and advantages will become apparent as the following description proceeds, taken in connection with the accompanying drawings, wherein:

Fig. 2 is an enlarged vertical sectional view taken longitudinally of the feed reel housing and cross rail structures of the machine shown in Fig. 1, as indicated by the line 2—2.

Fig. 3 is a further enlarged vertical sectional view taken transversely through the feed reel housing and in the plane of the line 3—3 in Fig. 2.

Fig. 4 is an enlarged fragmentary vertical sectional view taken longitudinally through the feed reel housing and in the plane of the line 4—4 in Fig. 3.

Fig. 5 is an enlarged fragmentary horizontal sectional view taken longitudinally through the right-hand end of the feed reel housing and in the plane of the line 5—5 in Fig. 2.

Fig. 6 is an enlarged fragmentary horizontal sectional view through the left-hand end of the feed reel housing and in the plane of the line 6—6 in Fig. 4.

Fig. 7 is an enlarged fragmentary horizontal sectional view taken in the plane of the line 7—7 in Fig. 3 and detailing the relative locations of certain vertically disposed feed lines leading to one of the headstocks.

Fig. 8 is an enlarged horizontal sectional view taken in the plane of the line 8—8 in Fig. 2 and detailing the relative arrangement of certain control lines terminating at a manifold on the bottom of a protective bracket.

Fig. 9 is an enlarged perspective view detailing a jumper plate which attaches to the manifold indicated in broken outline in Fig. 8.

Fig. 11 is a perspective view detailing certain of the feed reels per se and the flexible lines trained thereover, such view also illustrating one of the cam controlled profiling valves and its connecting lines.

Fig. 12 is a diagrammatic view illustrating the circuit connections for the hydraulic profiling valves and their alternate locations.

Figure 1:
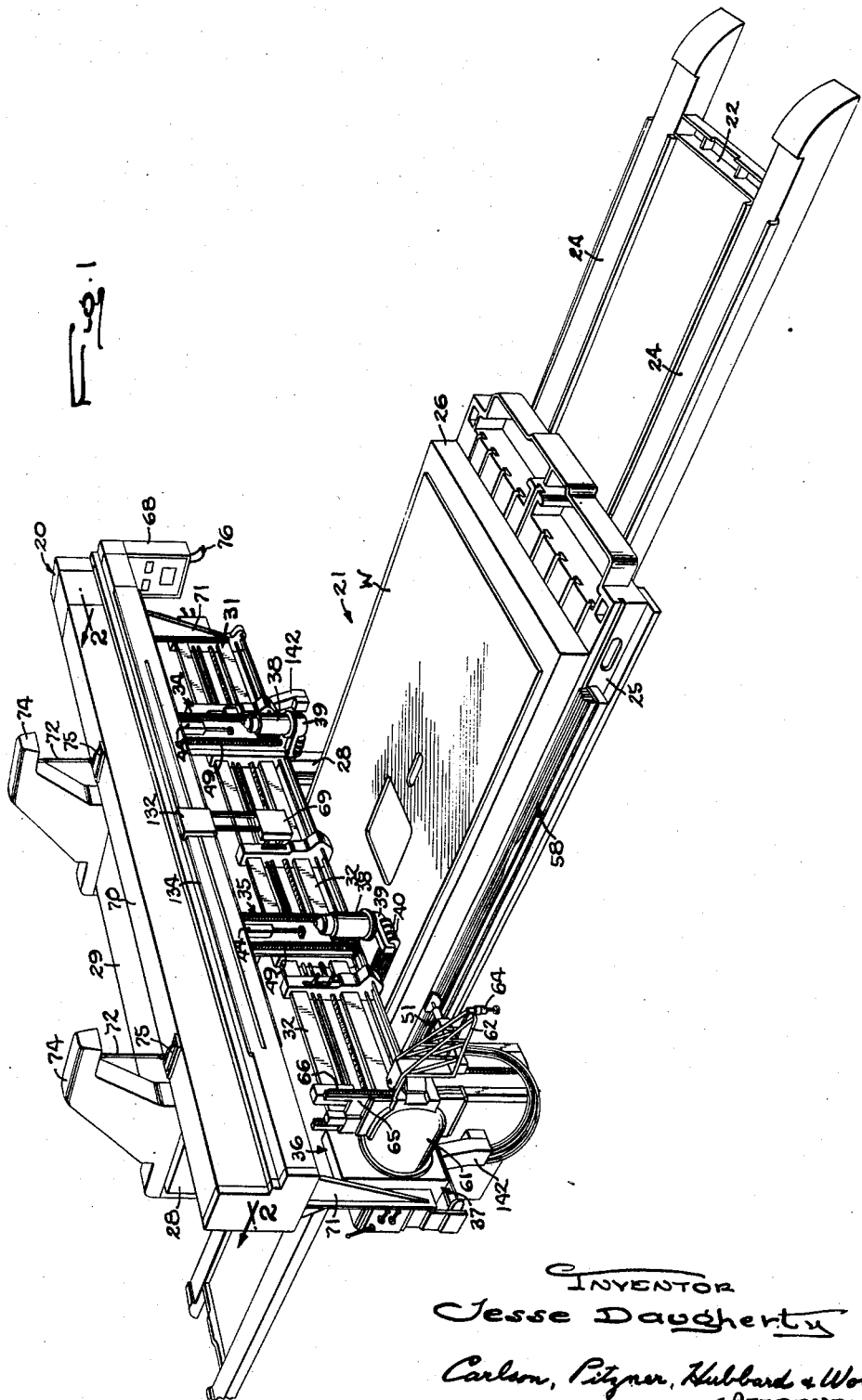
Figure 1 is a front perspective view of an illustrative planer-type milling machine equipped with a line feed means embodying the present invention.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Upon more specific reference to the drawings, it will be perceived that the invention is there exemplified in an illustrative line feed device 20 for a machine tool having a plurality of individually powered, translatable machine elements (see Figs. 1 and 2). In this instance, the line feed device 20 is operatively associated with a large, high speed planer-type milling machine 21, such for example, as the machine disclosed in our Patent No. 2,849,927, mentioned above.

As a preliminary to a description of the line feed device 20, it will be helpful to consider briefly the general structural aspects of the machine 21. As illustrated more particularly in Figs. 1 and 2, the machine 21 comprises a bed 22 having protectively covered horizontal ways 24 which slidably support a table 25. The latter may be reciprocated longitudinally of the bed 22 and ways 24 by means of a suitable drive (not shown). Mounted on the table 25 for bodily movement therewith is a relatively flat, box-like vacuum fixture 26 which holds a slab-shaped workpiece W for processing by the machine 21. Straddling the bed 22 and located at the central region thereof is a pair of spaced apart, upstanding columns 28 spanned by a transverse beam or "arch" 29. The front faces of the columns 28 are formed with vertical guideways 30 which are engaged by a cross rail 31 adapted to be traversed vertically along the ways 30. The front face of the cross rail 31 is provided with horizontally extending ways 32 which are adapted to carry a plurality of headstocks 34, 35, 36. The latter include appropriate saddles 37 slidably mounted on the cross rail ways 32, enabling each of the headstocks to be traversed or translated horizontally therealong. The headstocks 34 and 35 are each equipped with a water cooled electric motor 38 which drives a right angle milling attachment or cutter head 39 having one or more high speed cutters 40 mounted thereon for rotation about a horizontal axis. Each of the attachments 39 is adapted for adjustment in a horizontal plane through an angle of about 90°, permitting milling of the workpiece W longitudinally of the table, as well as cross milling operations transverse to the longitudinal axis of the table. The headstock 36 is also equipped with a water cooled electric motor (not shown) similar to the motors 38 but is furnished with a profiling cutter fastened directly to the motor shaft rather than being equipped with a right angle milling attachment.

Figure 10:
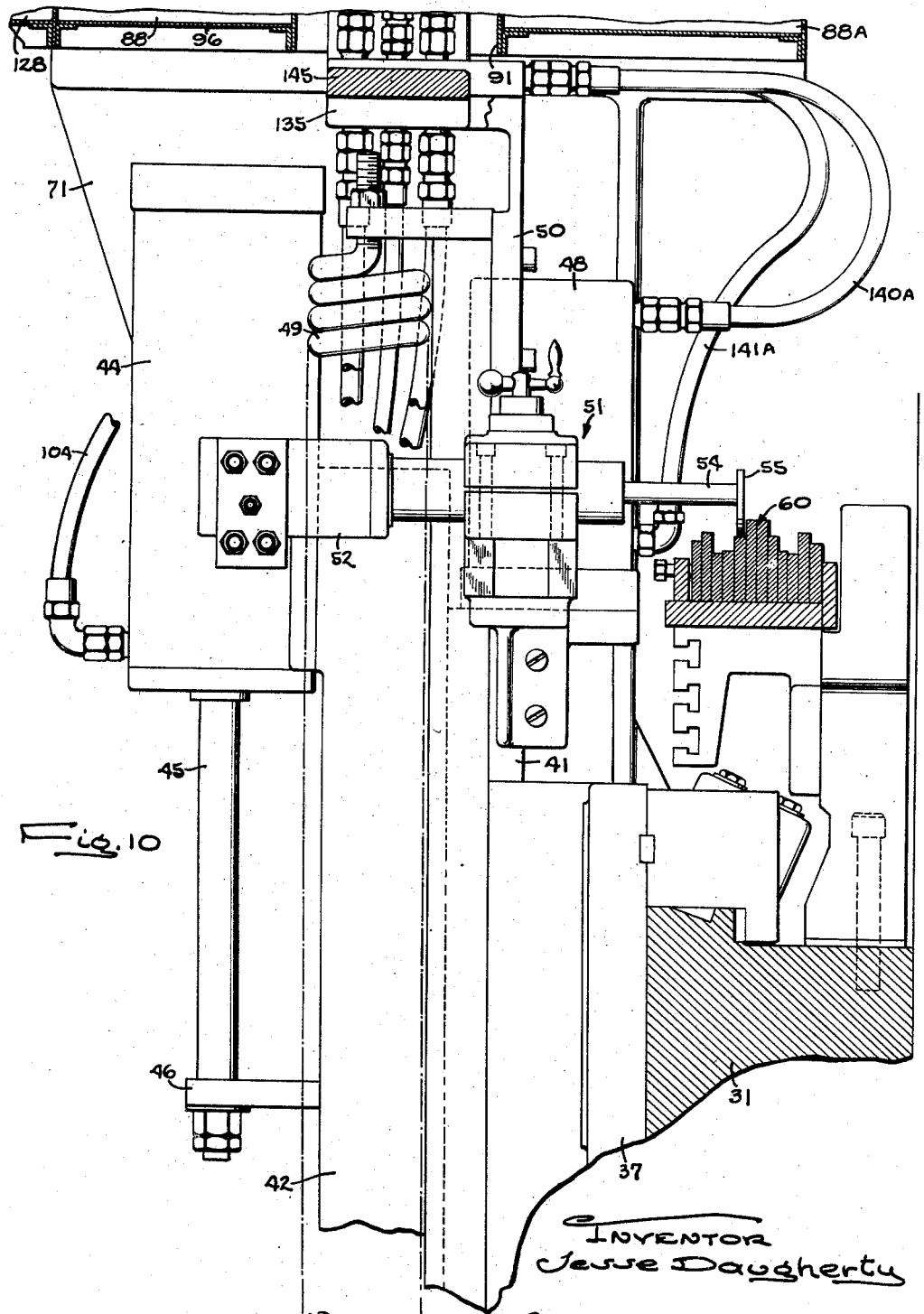
Fig. 10 is a fragmentary vertical sectional view showing the lower end portion of the structure illustrated in Fig. 3, but on a larger scale. A tracer control valve and certain details of the cross rail and headstock are also illustrated in Fig. 10.

The headstocks 34 and 35, which might be referred to as the right-hand and central headstocks, respectively, because of their relative locations as illustrated in Fig. 1, each comprise a dual slide assembly. This adapts both headstocks for rapid vertical adjustment of their cutters and also for tracer control operation. Referring in particular to Figs. 1, 3, 4 and 10, it will be noted that the saddle 37 of each of the headstocks 34, 35 carries a vertically movable inner slide 41 which, in turn, carries a vertically movable outer slide 42 serving as a mounting for the headstock motor 38 and its cutter head. Each outer slide 42 can be raised or lowered by means of a mechanical power take-off (not shown) from the cross rail 31. In addition, each of the outer slides 42 is suitably counterbalanced by means of an air cylinder 44 fixed to the outer slide 42 and having a depending piston rod 45 connected to the slide 41 as by means of a bracket 46 (Fig. 10). Each of the inner slides 41, on the other hand, has a hydraulic actuator 48 mechanically connected between itself and the saddle 37, the actuator 48 being adapted to impart a rise and fall movement to the slide 41 incident to tracer control operation. During such rise and fall movement, the outer slide 42, the motor 38 and cutter head 39 of each headstock 34, 35 all move bodily with its inner slide 41. The latter is guided vertically by means of an appropriate structural arrangement and the weight of all the foregoing parts is precisely counterbalanced by a series of relatively long springs 49 anchored to an upstanding bracket 50 fixed to the saddle 37 (Figs. 3, 4 and 10).

Tracer control operation of the headstocks 34, 35 is effected in the present instance by means of a pair of cam actuated hydraulic tracer control valves 51, one for each headstock. In general, each of the valves 51 comprises a body 52 having a stylus rod 54 and terminating in a semi-circular stylus disk 55. For milling operations parallel to the longitudinal axis of the table, each of the valves 51 is adapted to be supported from an individual slide 56 mounted on one of the machine columns 28, its stylus disk being actuated by any one of a series of profile cams 58 supported on the side of the table (see Figs. 1, 2 and 11). For cross milling operation of each headstock, its corresponding tracer control valve 51 is adapted to be mounted directly upon its respective inner or rise and fall slide 41, as by means of a bracket 59. In this location, each valve is actuated by any one of a series of profile cams 60 supported on top of the cross rail 31 (Figs. 4 and 10). To permit functioning of the valves 51 in either of their alternative positions, suitable hydraulic hoses or conduits extend between the valve operating stations adjacent the table and upon the rise and fall slides of the headstocks 34, 35.

The remaining headstock 36, which may be referred to as the left-hand headstock, is designed primarily for face and profile milling operations. Its motor and cutter are mounted on a swivel head 61 which permits universal swivel movement through an angle on the order of 15° from the vertical. The head 61 is also equipped with a truss-like swivel arm 62 (Fig. 1) carrying an electric tracer unit 64 for profiling in a horizontal plane. By means of appropriate electric controls, the tracer unit enables the headstock 36 to profile mill a workpiece on one portion of the table by tracing a templet mounted on another portion of the table. The headstock 36 also includes a saddle 37 which supports a rise and fall slide 65 similar in form to the slides 41 of the other headstocks. The slide 65 and its saddle 37 are also connected mechanically by a hydraulic actuator (not shown) which, in turn, is controlled by means of a solenoid valve. The actuator in this instance is not used for rise and fall contouring but rather as a convenient means for rapidly positioning the profiling tool for an initial cut or for rapidly retracting the tool from a finished cut. The vertically movable elements of the headstock 36 are also counterbalanced as by means of springs 66 similar to the springs 49 of the other headstocks.

The headstocks 34, 35, 36 may be raised or lowered at the option of the machine operator by means of push buttons or other controls incorporated into a fixed control panel 68 at the right-hand end of the machine as viewed in Fig. 1. Similar controls are also located on a movable control panel in the form of a pendant 69 which can be traversed laterally of the machine table in a direction parallel to the cross rail.

Turning now to the line feed device 20 in greater detail, it will be noted upon reference to Fig. 1 that a beam-like housing 70 is mounted on the cross rail 31 in vertically spaced, overlying relation therewith. The housing 70, which for purposes of description will be referred to as the feed reel housing, is of hollow, box-like form and extends with uniform clearance substantially the length of the cross rail, being secured thereto as by means of upstanding brackets 71. The feed reel housing 70 accommodates the various service and control lines or conduits which carry electricity, hydraulic pressure, cooling water, and compressed air to the headstocks 34, 35, 36 in a manner permitting them to be traversed along the ways 32 of the cross rail 31 without jeopardizing these lines. In addition, the housing 70 affords a convenient mounting for the fixed and the movable control panels 68, 69, at the same time accommodating the various line connections between them.

The feed reel housing 70 and the parts contained therein are suitably counterweighted by means of weights (not shown) situated within the upright machine columns 28. These weights are connected with cables 72 or other flexible tension elements trained over suitable sheaves within a pair of suspension brackets 74 which are mounted on the machine columns 28. From the suspension brackets 74, the counterweight cables 72 extend respectively to a pair of anchor brackets 75 fixed in spaced relation to the top of the feed reel housing 70.

As indicated in Figs. 1, 5, and 11, electric power is admitted to the feed reel housing 70 by means of a plurality of flexible leads 76 entering the bottom of the fixed control panel 68 which hangs in depending relation from the right-hand end of the housing 70. Cooling water and compressed air are also admitted to this end of the housing 70 by means of water lines 78 and air lines 79 (see Fig. 5). The hydraulic power required for the actuators of the headstocks 34, 35, 36 and the hydraulic tracer control valves is furnished by means of a hydraulic pump 80 driven by an electric motor 81 mounted at the left-hand end of the housing 70 and rearwardly thereof. The pump 80 supplies hydraulic fluid to a pressure line 82, such fluid being returned by a line 84. The motor 81 also drives a vacuum pump 85 which connects with the drain line 86 of the hydraulic system (Figs. 6 and 12).

Structurally, the feed reel housing 70 is of generally L-shaped cross section (Fig. 3), being partitioned internally to define a plurality of longitudinal compartments adapted to house the respective groups of flexible service and control lines for the different headstocks 34, 35 and 36 as well as for the movable control panel 69. In the present instance, the housing 70 has a pair of laterally spaced compartments 88, 88A, which receive the lines for the right-hand headstock 34. Superimposed upon the compartments 88, 88A is another pair of laterally spaced compartments 89, 89A which receive the lines for the central headstock 35. By the same token, a third pair of laterally spaced compartments 90, 90A is superimposed upon the compartments 89, 89A and accommodates the lines for the left-hand headstock 36. This tier-like arrangement of the various pairs of laterally spaced line compartments defines within the feed reel housing 70 a central well 91 substantially coextensive in length with the housing. The compartments 88, 89, 90 are all of identical size and each contains a feed reel or sheave 92 supported as by means of a floor plate 94. By the same token, the compartments 88A, 89A and 90A are also of identical size and each contains a feed reel or sheave 95 supported as by means of a floor plate 96. Each of the feed reels 92, 95 is adapted to roll longitudinally along the floor 94 or 96 of its particular compartment, being constrained against motion in any other direction by means of closely spaced compartment side walls having guide strips 98. The reels 92, 95 each have a series of grooves for receiving individually the flexible service and control lines which are fed to the headstocks from fixed connections at the longitudinal extremities of the feed reel housing 70.

To receive its service and control lines from its individual feed reels, each of the headstocks 34, 35 and 36 is provided with a suitable guide means extending into the central well 91 of the feed reel housing and also into its corresponding pair of feed reel compartments, the guide means being translatable bodily with its particular headstock. Accordingly, the right-hand headstock 34 has an upstanding hollow stem or duct 99 rigidly mounted on its bracket element 50. The duct 99 extends upwardly into the central well 91 of the housing 70 with ample side clearance to permit movement longitudinally thereof, eventually terminating in a laterally extending tray 100 which projects into both of the reel compartments 88, 88A through slots in their inner side walls (Figs. 2, 3, 4 and 11). As indicated most clearly in Figs. 3 and 11, the tray 100 is of shallow, rectangular form and has a lateral dimension permitting it to extend almost to the far wall of each of the compartments 88, 88A. Preferably, the floor 101 of the tray is solid except for a flared rectangular aperture 102 defining the mouth of the duct 99 (Fig. 11). The side wall of the tray 100 closest to the feed reels 92, 95 has a plurality of spaced apart holes therethrough corresponding in size and spacing to the grooves on the reels 92, 95.

As indicated most clearly in Figs. 5 and 11, the flexible service and control lines or conduits for the right-hand headstock 34 originate in fixed connections in the right-hand end of the feed reel housing 70 and extend along the floors of the feed reel compartments 88, 88A. Starting at the rear and coming forward, it will be perceived that the compartment 88A contains an air line 104, cooling water inlet and outlet lines 105, 106, hydraulic drain line 108, hydraulic pressure line 109 and hydraulic return line 110. All of the lines in this group are maintained in spaced apart parallel relation within the compartment 88A and are carefully trained around individual grooves in the feed reel 95 (Figs. 3 and 11). From the latter, these lines extend through their corresponding holes in the side of the tray 100, being lead along the tray floor 101 and then downwardly into the duct 99, terminating at their various connecting fittings on the headstock 34. Similarly, the compartment 88 contains flexible electric power leads 111, 112, 113, and an electrical control lead 114, all of the latter originating at terminal points located within the fixed control panel 68. The leads in this group extend in spaced apart parallel relation and are trained along individual grooves in the feed reel 92 (Figs. 3 and 11), extending from the latter through corresponding holes in the side of the tray 100 and thence down into the duct 99, tending at various terminal points on the headstock 34.

The flexible lines or conduits for the headstock 34 and its feed reels 92, 95 are maintained under proper tension at all times by the use of a tensioning mechanism similar to that disclosed in Jones Patent No. 2,395,485, supra. Referring once more to Figs. 2, 3 and 4, it will be noted that such mechanism comprises a pair of cables or other flexible tensile elements 115 operatively associated with each feed reel. The elements 115 are fastened at one end to resilient anchor fittings 116 at the left end of the housing 70 and are then trained around their corresponding feed reels 92, 95. From the latter, the cables 115 extend around corresponding pairs of fixed guide sheaves 118 journaled in axially spaced relation in the compartments 88, 88A near their upper, left-hand ends (Fig. 2). From the sheaves 118, each pair of tensioning cables 115 is lead over a corresponding pair of fixed guide sheaves 119 located near the upper, right-hand end of each compartment 88, 88A, finally leading back to anchor points 120 on the side of the tray 100 remote from the feed reels 92, 95. By reason of such arrangement, it will be noted that a linear displacement of the headstock 34, including its duct 99 and tray 100, along the cross rail will cause its feed reels 92, 95 to roll along their respective compartment floors and effect a linear displacement equal to half that of the headstock 34. This results in the paying out or the taking up of slack in the flexible lines at precisely the proper rate to avoid drag on the headstock, maintaining such lines under the desired tension at all times within the limits of translational movement of the headstock. The arrangement is not affected by vertical displacements of the headstock slides 41, 42 since these displacements are compensated for by a moderate amount of slack in the lower ends of the lines coming out of the duct 99.

The remaining headstocks 35, 36 receive their service and control lines from their particular feed reels 92, 95 in a manner similar to that just outlined for the headstock 34. Thus the headstock 35 has mounted on its bracket element 50 a duct 121 somewhat higher than the duct 99 but otherwise similar to it. The duct 121 terminates at its upper end in a tray 100 which reaches into the compartments 89, 89A containing the lines for the headstock 35. These lines originate at the right-hand or inlet end of the feed reel housing 70, as indicated in Fig. 5, extending forward and then leading leftwardly across the entire feed reel housing via a fixed duct 124 at the front of the housing 70. The lines lead from the left end of the duct 124 into a header compartment 125 at the left end of the housing (Figs. 4 and 6) where some may change from rigid to flexible conduit, eventually entering the left-hand ends of the compartments 89, 89A. These lines are thereupon trained around the feed reels 92, 95 and into the tray 100 in the same manner as the lines for the headstock 34. The left-hand headstock 36 carries an upstanding duct 126 similar to the ducts 99, 121 but of still greater height. The duct 126 also terminates in a tray 100 which reaches into the compartments 90, 90A and receives the flexible lines for the headstock 36 from the feed reels in a manner similar to that already described. These lines, like the lines for the headstock 34, enter the compartments 90, 90A directly from the inlet or right-hand end of the housing 70.

Since the feed reels 92, 95 for the headstocks 35, 36 are each tensioned by a mechanism identical with that described for the feed reels of the headstock 34, an extensive description of such mechanism is unnecessary. Suffice it to say that the additional tensioning mechanisms include cables 115 anchored by fittings 116, 120 and trained over fixed guide sheaves 118, 119 located near the extremities of the feed reel compartments 89, 89A, 90 and 90A (Fig. 2).

In addition to the compartments for the headstock feed reels, the housing 70 includes an additional reel compartment 128 which runs along its lower front portion (Fig. 3). The compartment 128 houses a feed reel or sheave 129 having the flexible electric lines or cables 130 for the slidable control panel or pendant 69 trained thereover. The feed reel 129 is tensioned in a manner similar to that just described for the other feed reels and is adapted to roll longitudinally of the compartment floor to pay out or take up slack in the flexible lines 130 in accordance with linear displacements of the control pendant 69. As indicated in Fig. 11, these lines extend from the fixed control panel 68 at the right-hand end of the feed reel housing to a horizontal tray 131 which projects into the compartment 128 from the head 132 of the pendant 69 (see Fig. 11). The head 132 is adapted to slide along guideways 134 supported on the outside edge of its reel compartment and extending longitudinally of the feed reel housing (Figs. 3 and 6).

For the purpose of minimizing the number of lines passing over the feed reels for the headstocks 34, 35, an interesting doubling-up means is utilized. Such means is applied to certain hydraulic conduits associated with the tracer control valves 51 and takes full advantage of the fact that each valve 51 has one operative position adjacent the machine table 25 and an alternate operative position on the inner or rise and fall slide 41 of its associated headstock. Referring first to the valve 51 as illustrated in Figs. 2, 10, 11 and 12, it will be noted that each such valve has associated therewith a detachable manifold in the form of a transfer plate 135 connected to the valve body 52 by means of a plurality of short, flexible jumper conduits. These include hydraulic pressure conduit 136, hydraulic return conduit 138, hydraulic drain conduit 139, and hydraulic control conduits 140, 141 which ultimately communicate with control conduits 140A, 141A, leading to the hydraulic actuator 48 of the associated headstock. In the present instance, an air line and an electrical line also extend from the transfer plate 135 to the valve 51 but these two lines need not be further considered for present purposes.

To afford a mounting for the transfer plate 135 of each valve 51 when in its table position, the cross rail 31 has a pair of depending brackets 142, one such bracket being located in the vicinity of each machine column 28 (Figs. 2 and 8). Each of the brackets 142 terminates in a fixed manifold in the form of a plate 144, the latter being adapted to receive the transfer plate 135 in sealed, abutting relation therewith. Each fixed manifold plate 144 connects with the main hydraulic pressure and return lines 82, 84, as well as with main hydraulic drain line 86, as indicated in Figs. 8 and 12. In addition, each fixed manifold plate 144 connects with a corresponding pair of hydraulic conduits 109, 110 which lead to a respective one of the headstocks 34, 35 via one of the feed reels 95. A branch of the main hydraulic drain line 86, designated by the reference numeral 108, also leads to each of the headstocks 34, 35 via one of the feed reels 95, along with the lines 109, 110. These three lines terminate in a second fixed manifold in the form of a plate 145 mounted on each headstock 34, 35 at the base of its upstanding duct (Figs. 3 and 10).

With the connections just described, it is clear that the two pairs of lines 109, 110 extending between the fixed manifold plates 144 and 145 and leading over the respective feed reels 95 of the headstocks 34, 35 serve as control lines when their respective tracer control valve 51 occupies its position adjacent the table. In their capacity as control lines, the conduits 109, 110 communicate between the jumper control lines 140, 141 attached to the valve 51 and the jumper control conduits 140A, 141A, attached to the hydraulic actuator 48 on their associated headstock (Fig. 12). However, when the tracer control valve 51 occupies its alternative operating position on the headstock, the jumper control lines 140, 141 attached to the valve 51 communicate directly with the jumper control conduits 140A, 141A of the actuator 48 via the transfer plate 135 and the fixed manifold plate 145 on the headstock. This makes it possible to utilize the lines 109, 110, which already extend over the feed reel 95, to connect the main hydraulic pressure and return lines 82, 84 with the pressure and return lines 136, 138 of valve 51 on the headstock. Such connection is readily effected in a remarkably simple manner by the use of a jumper manifold for each tracer control valve 51. Each such manifold is in the form of a jumper plate 146 (Fig. 9), being designed for attachment in sealed abutting relation to the fixed manifold plate 144 at the base of each manifold bracket 142. The abutting face of each plate 146 is fashioned with a pair of oblong recesses 148, 149 adapted respectively to register with the terminal ends of the conduits 82, 109, on the one hand, and the conduits 84, 110 on the other hand (Figs. 9 and 12). To insure proper registration at all times, each jumper plate 146 is provided with an upstanding pair of dowel pins 150, 151 which interfit with corresponding holes in the plate 144. The pins 150, 151 in this instance happen to be offset slightly from the longitudinal center line of the plate 146, thus making it possible to attach the jumper plate 146 in only one position on its associated manifold plate 144.

In addition to the function just described, the jumper plate 146 also serves as a connection for the headstock ends of the lines 109, 110 and the jumper control conduits 140A, 141A, when the valve 51 of one of the headstocks 34, 35 is not in its headstock position. Under these circumstances, the plate 146 registers with the fixed manifold plate 145 on the headstock in the same manner as it registers with the plate 144 on the bracket 142.

I claim as my invention:

1. A cross beam assembly for a machine tool comprising a machine element positioned on and depending below said cross beam and susceptible of translational movement therealong, a hollow box-like housing having an elongated compartment therein, said housing being supported by and above the cross beam solely adjacent the ends thereof and substantially parallel with the cross beam, a feed reel enclosed within said compartment and constrained to roll longitudinally thereof, a plurality of flexible feed lines for said machine element trained over said feed reel from an anchorage in said housing, means for tensioning said feed reel and said flexible lines continuously, a support fixed to the machine element for translational movement therewith and extending vertically above the cross beam to the level of said housing laterally of said housing into said compartment, said support being adapted to receive lines from said reel and to lead them toward said machine element.

2. A multiple line feed for a machine tool having guide ways with an individually powered headstock supported for translational movement thereon, said line feed comprising the combination of a beam-like housing providing support for a pair of feed reels disposed in laterally spaced relation within said housing, means within said housing constraining said feed reels against movement other than rolling movement in paths substantially parallel to the translational path of said headstock, a plurality of flexible lines trained over each said feed reel, said lines extending from anchorage points on said housing to terminal points on said headstock, means supported within said housing for tensioning each said feed reel and the flexible lines thereon, a duct having one end adapted for rigid attachment to the headstock for translational movement therewith with its opposite end projecting into said housing and between the paths of said feed reels, and line support means fixed to said projecting end of said duct for receiving said flexible lines from said feed reels, and means for supporting said housing in overlying relation with the guide ways and spaced therefrom to allow translational movement of said headstock and said duct without interference with the housing.

3. A multiple line feed for the hydraulic conduits, electric cables and the like on a milling machine having a cross rail with a plurality of individually powered headstocks mounted for translation therealong, said multiple line feed comprising, in combination, a beam-like housing having a plurality of pairs of laterally spaced compartments disposed in substantial vertical alinement and defining a central well, said compartments being arranged in laterally spaced pairs flanking said well extending longitudinally of said housing, means for mounting said housing on said cross rail in overlying relation and longitudinal alinement with the same, a plurality of upstanding ducts each fixed to one of the headstocks for translation therewith and projecting into the central well of said housing, each said duct being of different height from the others and terminating in a tray which projects laterally from said central well into one respective pair of said compartments, a plurality of take-up sheaves, one said sheave being located in each said compartment and mounted to roll longitudinally thereof, a plurality of flexible lines trained over said sheaves, said lines extending from fixed anchorages on said housing to respective ones of said headstocks via said trays and ducts, and resilient means for tensioning said sheaves and the flexible line trained thereover.

4. A multiple line feed for the flexible service and control lines of a planer type milling machine having a cross rail with a plurality of headstocks mounted for translation therealong and a control pendant translatable in a path substantially parallel to said cross rail, said multiple line feed comprising, in combination, a box-like feed reel housing, means defining within said housing a plurality of longitudinal compartments, certain ones of said compartments being arranged in superimposed laterally spaced pairs defining a central well, the remaining one of said compartments being situated adjacent one of the compartments of said pairs, bracket means for mounting said housing on said cross rail in overlying relation with the same, a plurality of upright ducts fixed to each of the headstocks for translation therewith and projecting into the central well of said housing, each said duct terminating in a tray which projects laterally from said central well into one respective pair of said compartments, a tray adapted for rigid attachment to the control pendant and projecting into said remaining one of said compartments, a plurality of feed reels, one said feed reel being located in each said compartment and mounted to roll longitudinally thereof, a plurality of flexible lines trained over said feed reels, said lines extending from fixed anchorages on said housing to respective ones of said headstocks and said control pendant via said trays and said ducts, and resilient means for tensioning said feed reels and the flexible lines trained thereover.

5. A cross beam assembly for a machine tool having a plurality of machine elements supported on a cross rail of said cross beam assembly and susceptible of longitudinal movement therealong, comprising a hollow beam-like housing supported spaced above and in overlying relation with said cross rail and having a plurality of longitudinal compartments therein arranged one above the other, a plurality of feed reels mounted in respective ones of said compartments and susceptible of rolling movement longitudinally thereof, a plurality of flexible feed lines for said machine elements trained over each said feed reel, means for continuously tensioning each said feed reel and the flexible lines trained thereover, a plurality of upstanding ducts fixed to respective ones of the machine elements for longitudinal movement therewith, a tray fixed to each end of said duct remote from its corresponding machine element, each said tray extending laterally of said housing into at least one of said compartments, said trays being adapted to receive lines from said feed reels and to support them for entry into the ducts of said machine elements.

6. In a machine tool having a pair of spaced upright columns, a cross rail vertically movable thereon, an individually powered headstock supported therefrom for translational movement along the cross rail length, a self-contained multiple line feed assembly for said headstock comprising a hollow beam supported spaced above and substantially parallel with said cross rail, a pair of feed reels disposed in spaced relation within said beam means within said beam constraining said feed reels against movement other than rolling movement in paths substantially parallel to the translational path of said headstock, a plurality of flexible lines trained over each said feed reel, said lines extending from anchorage points in said beam to terminal points on said headstock, means for tensioning each said feed reel and the flexible lines thereon, a duct supported by the headstock for translational movement therewith and with its opposite end projecting into said hollow beam and between the paths of said feed reels, said housing being open between the paths of said feed reels to allow translational movement of said duct without interference, and line support means fixed to said projecting end of said duct for receiving said flexible lines from said feed reels.

7. In a machine tool having a cross rail, a plurality of individually powered headstocks mounted for translational sliding movement along said cross rail and depending below said cross rail for machining a workpiece, said headstocks requiring multiple service lines, a feed reel assembly for the service lines for said headstocks comprising, a plurality of feed reels vertically arranged above the cross rail, means for supporting said fed reels comprising a housing having a plurality of longitudinal compartments arranged vertically one above the other, each of said compartments receiving one of said feed reels and providing a floor along which said one fed reel rolls, said housing being supported for uniform clearance with said cross rail and solely adjacent the ends thereof to allow translational movement of said headstocks without interference with said housing, a plurality of upright ducts each fixed to one of the headstocks and terminating in a tray which projects laterally into one of said compartments, service lines for each one of said headstocks being trained around one of said reels and extending from fixed anchorages on said housing to respective ones of said headstocks via said trays and ducts, and resilient means for tensioning said reels and the service lines trained thereover.

8. In a machine tool having a cross rail assembly and a plurality of individually powered headstocks mounted for translational sliding movement along said cross rail for machining a workpiece supported below the cross rail, said headstocks requiring multiple lines for servicing, a feed reel assembly for the service lines for said headstocks comprising a plurality of feed reels arranged in a vertical tier above the cross rail, means for supporting said feed reels comprising a housing overlying the cross rail, spaced from the cross rail, and supported by the cross rail solely adjacent the ends thereof to allow translational movement of said headstocks along the cross rail without interference, said housing having a plurality of horizontal compartments arranged substantially parallel with the cross rail and in a vertical tier, each compartment receiving one of said tiered feed reels and providing a floor along which said one feed reel rolls, a plurality of ducts each supported by one of said headstocks to extend vertically above said cross rail to a level adjacent one of said housing compartments, a tray supported on the upper end of each of said ducts, each compartment of said housing having a longitudinal slot in one side wall thereof through which said tray extends, the multiple service lines for each of said headstocks being trained around the feed reel in the respective compartment and extending from fixed anchorages therein to respective ones of said headstocks via said trays and ducts, and resilient means for tensioning said feed reels and the service lines trained thereover.

9. In a machine tool having a table supported for horizontal reciprocation on the bed of the tool, a pair of upstanding columns straddling the table, a cross rail spanning said columns and vertically positionable thereon, a plurality of individually powered headstocks mounted for translational sliding movement along said cross rail and depending below said cross rail for machining a workpiece carried on the table, said headstocks requiring multiple service lines, a feed reel assembly for the service lines for said headstocks comprising a plurality of feed reels arranged in a vertical tier above the cross rail each having the multiple service lines for one of said headstocks trained thereover, means for supporting said feed reels comprising a housing overlying the cross rail, and supported for uniform clearance by the cross rail adjacent the ends thereof to allow translational movement of said headstocks along the cross rail without interference, said housing having a plurality of vertically arranged compartments, each compartment receiving a corresponding one of said tiered feed reels and providing a floor along which said one feed reel rolls, a plurality of ducts each supported by one of said headstocks and extending vertically above said cross rail to a level adjacent the corresponding feed reel, a tray supported on the upper end of each of said ducts, each compartment of said housing having a longitudinal slot in one wall thereof through which said tray extends, the multiple service lines for each of said headstocks being trained around the feed reel contained in the respective compartment and extending from fixed anchorages therein to respective ones of said headstocks via said trays and ducts, and means supported within each of said compartments for tensioning of said feed reels and the service lines trained thereover.

10. A multiple line feed for the service lines on a milling machine having a cross rail with a plurality of individually powered headstocks mounted for translation therealong, said multiple line feed comprising, in combination, a plurality of take-up sheaves arranged in vertical tiers above the cross rail, and means supporting said take-up sheaves, comprising a housing overlying the cross rail and substantially parallel therewith and supported by the cross rail solely adjacent the ends thereof to allow translational movement of said headstocks along the cross rail without interference, said housing having a plurality of pairs of laterally spaced compartments disposed in substantial vertical alignment and defining a central well, said compartments extending substantially parallel with said cross rail and longitudinally of said housing, a plurality of upstanding ducts each fixed to one of the headstocks for translation therewith and projecting into the central well of said housing, each said duct being of different height from the others and terminating in a tray which projects laterally from said central well into one respective pair of said compartments, one of said take-up sheaves being located in each said compartment mounted to roll along the floor thereof, the service lines for said headstocks being trained over said take-up sheaves, said lines extending from fixed anchorages on said housing to respective ones of said headstocks via said trays and ducts, and resilient means for tensioning said take-up sheaves and the service lines trained thereover.

References Cited in the file of this patent
UNITED STATES PATENTS

| | | |
|---|---|---|
| 1,848,915 | Trosch | Mar. 8, 1932 |
| 1,873,375 | Forward et al. | Aug. 23, 1932 |
| 2,104,756 | Oberhoffken | Jan. 11, 1938 |
| 2,201,954 | Flygare | May 21, 1940 |
| 2,206,174 | Falk | July 2, 1940 |
| 2,395,485 | Jones | Feb. 26, 1946 |
| 2,400,729 | Alden | May 21, 1946 |
| 2,416,860 | Waldie | Mar. 4, 1947 |
| 2,417,671 | Armitage | Mar. 18, 1947 |
| 2,417,672 | Armitage | Mar. 18, 1947 |